United States Patent [19]

Stanke et al.

[11] 4,182,484

[45] Jan. 8, 1980

[54] TEMPERATURE CONTROL FOR VARIABLE VOLUME AIR CONDITIONING SYSTEM

[75] Inventors: Dennis A. Stanke, La Crescent, Minn.; Paul C. Rentmeester, La Crosse, Wis.

[73] Assignee: The Trane Company, La Crosse, Wis.

[21] Appl. No.: 899,627

[22] Filed: Apr. 24, 1978

[51] Int. Cl.² .............................................. F25B 29/00
[52] U.S. Cl. ...................... 236/1 C; 165/26; 236/49; 236/91 F; 318/625
[58] Field of Search ............... 165/26; 236/1 C, 91 F, 236/49, 91 G, 1 B, 91 D, 78 C; 318/461, 625, 672

[56] References Cited

U.S. PATENT DOCUMENTS

| | | | |
|---|---|---|---|
| 3,377,545 | 4/1968 | Tveit | 165/26 X |
| 3,388,860 | 6/1968 | Kruper | 236/1 C |
| 3,682,381 | 8/1972 | Eckman | 236/38 |
| 3,690,548 | 9/1972 | McNabney | 236/1 C |
| 3,725,644 | 4/1973 | Bailey | 236/1 C |
| 3,734,192 | 5/1973 | Dean, Jr. | 165/39 |
| 3,806,027 | 4/1974 | Ginn et al. | 236/49 |
| 3,934,795 | 1/1976 | Ginn et al. | 236/13 |

*Primary Examiner*—William E. Wayner
*Attorney, Agent, or Firm*—Carl M. Lewis; Peter D. Ferguson

[57] ABSTRACT

A temperature control is disclosed for a variable volume air conditioning system of the type wherein electric motor-operated air valve means are provided for varying the volume and relatively warm or relatively cool conditioned air supplied to a conditioned zone. The control includes zone thermostat means for producing an electrical error signal having a magnitude which varies in a predetermined relationship with respect to a deviation in zone temperature, and change-over circuit means for varying said predetermined relationship in order to accommodate changeover between heating and cooling, as sensed by duct temperature sensing means. The control further includes flow limit circuit means for imposing limits upon the maximum and minimum desired flow of conditioned air through the air valve means.

10 Claims, 4 Drawing Figures

TEMPERATURE CONTROL FOR VARIABLE VOLUME AIR CONDITIONING SYSTEM

CROSS-REFERENCES TO RELATED APPLICATIONS

The present application is related to copending U.S. Pat. application Ser. No. 899,628 filed Apr. 24, 1978, now U.S. Pat. No. 4,135,396 entitled, "Temperature Compensating Fluid Velocity Sensing Apparatus" by Dennis A. Stanke, Paul C. Rentmeester, and Paul D. Ulland; which application is commonly assigned with the present application. The temperature control disclosed in the present application may utilize the velocity sensing apparatus disclosed in the referenced application, the disclosure of which is hereby incorporated herein.

BACKGROUND OF THE INVENTION

1. Field of the Invention

Building air conditioning systems are currently in use today which are of the variable air volume type; that is, in order to control the temperature within a conditioned zone, the volume of conditioned air, either heated or cooled, supplied to the zone is varied in accordance with the heating or cooling load within the zone. Conventionally, air valve means are provided for throttling the flow of conditioned air, which air valve means may be operated by an electric motor, typically of the low voltage type providing bi-directional operation.

In order to sense the heating or cooling load within the conditioned zone, it is common practice to provide a zone thermostat, either located directly within the conditioned zone or in a return air passage at a position so as to sense the temperature of return air from the zone. Associated control circuitry has been provided in order to operate the air valve means in response to the heating or cooling load within the zone, as sensed by the thermostat. In order to provide proper operation of the system during both the heating and cooling modes, it has been necessary to provide control circuitry having suitable changeover capability, it being further desirable to limit both the minimum and maximum flow of conditioned air to the zone in order to maintain proper ventilation requirements and prevent drafts or excessive noise within the conditioned zone.

2. Description of the Prior Art

Prior art temperature controls of which applicants are aware, and which are exemplified by U.S. Pat. Nos. 3,690,548; 3,682,381; and 3,734,192; include a bi-directional electric motor for opening and closing suitable air valve means in order to vary the flow of conditioned air to a conditioned zone. Changeover between heating and cooling is provided in these systems through the use of a duct thermostat having switch means which are disposed directly in series with the electrical conductors which energize the aforesaid bi-directional motor. Upon a change in the duct temperature, the heating and cooling signals from the zone thermostat are simply applied to opposite windings of the bi-directional motor in order to reverse its sense of operation with respect to the thermostatic signal. The '548 patent further includes provision for limiting the maximum flow through the air valve by providing a switch which, upon occurrence of a flow exceeding the maximum desired, energizes the closing windings of the valve motor.

SUMMARY OF THE INVENTION, OBJECTS

The temperature control of the present invention includes zone thermostat means for sensing the temperature within a conditioned zone, determining the deviation between a set-point temperature and the zone temperature, and producing an electrical error signal having a magnitude which varies in a predetermined relationship with respect to said deviation in temperature. Duct temperature sensing means are provided for sensing the temperature of conditioned air being supplied to the conditioned zone and for producing an electrical duct temperature signal related thereto.

Changeover circuit means are provided for receiving both the error signal and duct temperature signal, which changeover circuit means are operative to vary the predetermined relationship between the magnitude of the error signal and the deviation in temperature in response to a temperature of the conditioned air indicative of one of relatively warm or relatively cool conditioned air being supplied to the conditioned zone. The changeover circuit means are further operative, in response to a temperature of conditioned air indicative of the other of said relatively warm or relatively cool conditioned air being supplied to said conditioned zone, to maintain the predetermined relationship between the magnitude of the error signal and deviation in temperature. Thus, the error signal produced by the thermostat is modified by the changeover circuit means in order to provide proper system operation without the need for additional changeover switch means associated with the air valve means operating motor.

Valve motor control circuit means are provided for receiving the error signal and for energizing electric motor operated air valve means in response thereto.

Further, the temperature control of the present invention includes flow limit circuit means and feedback circuit means for placing limits upon the magnitude of the error signal in order to limit the maximum and minimum desired flow of conditioned air through the air valve means, and for producing a feedback signal related to the actual volume of conditioned air flow through said air valve means. Valve motor control circuit means are provided for receiving the error and feed-back signals for energizing electric motor-operated air valve means in resonse thereto such that the actual volume of conditioned air flow through the air valve means is related to the magnitude of the error signal, thereby preventing a flow of conditioned air outside said maximum or minimum desired flow.

Accordingly, it is an object of the present invention to provide a temperature control for a variable volume air conditioning system wherein electric motor-operated air valve means are provided for varying volume of relatively warm or relatively cool conditioned air supplied to a conditioned zone, which control includes changeover circuit means for varying the error signal from zone thermostat means so as to effect proper system operation during both a heating and cooling mode.

It is a further object of the present invention to eliminate the need for changeover switch means located in series with the energizing conductors of the air valve means operating motor in order to provide the aforesaid changeover function.

Another object of the present invention lies in the provision of flow limit circuit means and feedback circuit means for placing limits upon the magnitude of a zone thermostat error signal related to the maximum and minimum desired flow of conditioned air through the air valve means, and producing a feedback signal related to the actual volume of conditioned air flow through said air valve means; said error signal and feedback signal being received by valve motor control circuit means which energize electric-motor operated air valve means in response thereto such that the actual volume of conditioned air flow through the air valve means is related to the magnitude of the error signal; thereby preventing excessive noise from the air conditioning unit while maintaining minimum ventilation requirements to the conditioned zone.

These and further objects of the present invention will become apparent from the following description of a preferred embodiment and by reference to the accompanying drawings.

DESCRIPTION OF A PREFERRED EMBODIMENT

Figure 1:
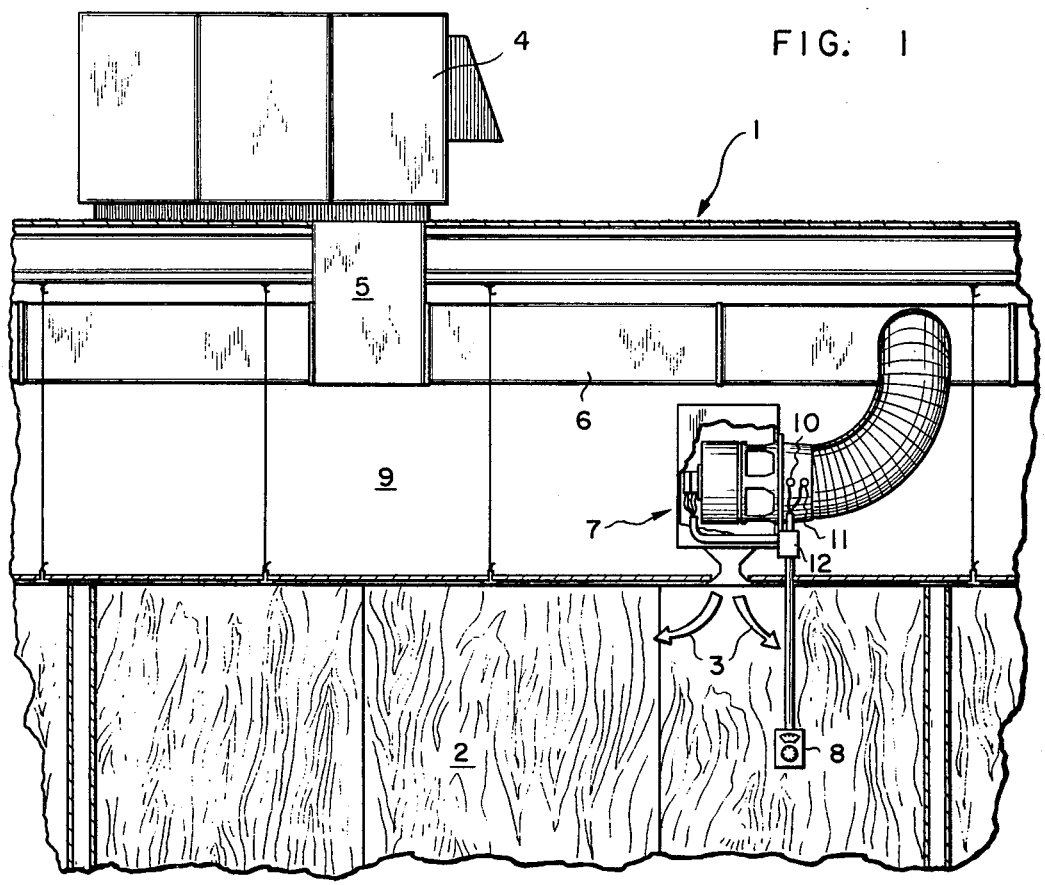
FIG. 1 is a schematic representation of an air conditioning system of the variable air volume type embodying the temperature control of the present invention.

Turning now to FIG. 1 of the drawings, there is illustrated in cross section a schematic representation of a structure indicated generally by reference numeral 1 which includes an air conditioning system of the variable air volume type. The structure 1 includes an interior conditioned zone 2, the temperature of which is to be maintained at a desired level by the supply thereto of conditioned air represented by arrows 3.

Figure 3:
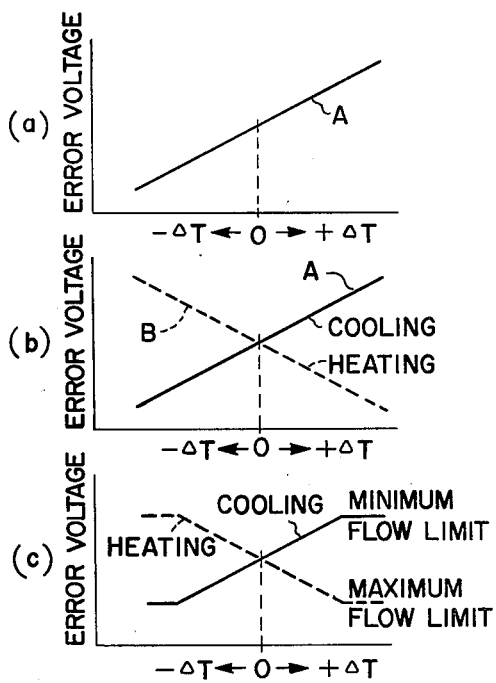
FIG. 3 is a series of graphs plotting the relationship between the electric error signal and the deviation between the set-point temperature and the zone temperature.

A source of conditioned air is provided by air conditioning unit 4 which, as illustrated, is disposed on the roof of structure 1. Air conditioning unit 4 may be of conventional construction and is of the type capable of supplying either heated, relatively warm; or cooled, relatively cool air via suitable ductwork 5 to the air distribution system of structure 1. The building ductwork may include a supply duct 6 which serves a plurality of individual air discharge units (only one of which is illustrated) such as that indicated generally by reference numeral 7. Air handling unit 7 is preferably of the type disclosed in U.S. Pat. No. 4,082,114, FIGS. 3 and 6, wherein a bi-directional electric motor is provided for operating air valve means in order to vary the volume of conditioned air supplied to a conditioned zone.

As further seen in FIG. 1, zone thermostat means 8 are provided, disposed within conditioned zone 2, so as to accurately sense the temperature prevailing therein. It is within the scope of the invention, however, that zone thermostat means 8 be disposed at some other location, such as for example within plenum space 9, in the event that such space is used as a return air passage and thus assumes the temperature of conditioned zone 2. Suitable electrical conductors are illustrated interconnecting zone thermostat means 8, the electric motor which operates air valve means 7, and sensors 10 and 11 (which will be described hereinafter) to temperature control circuitry indicated at 12 and which will be described in detail by reference to FIG. 2.

It should be apparent to those skilled in the art that the system of FIG. 1 operates as a variable air volume air conditioning system in that, as a demand for heating or cooling is sensed within conditioned zone 2 by zone thermostat means 8, air handling unit 7 is controlled in order to increase the flow of respective heated or cooled air thereto in order to satisfy said demand; similarly, upon satisfaction of said heating or cooling demand, the flow of respective heated or cooled air will be decreased.

Figure 2:
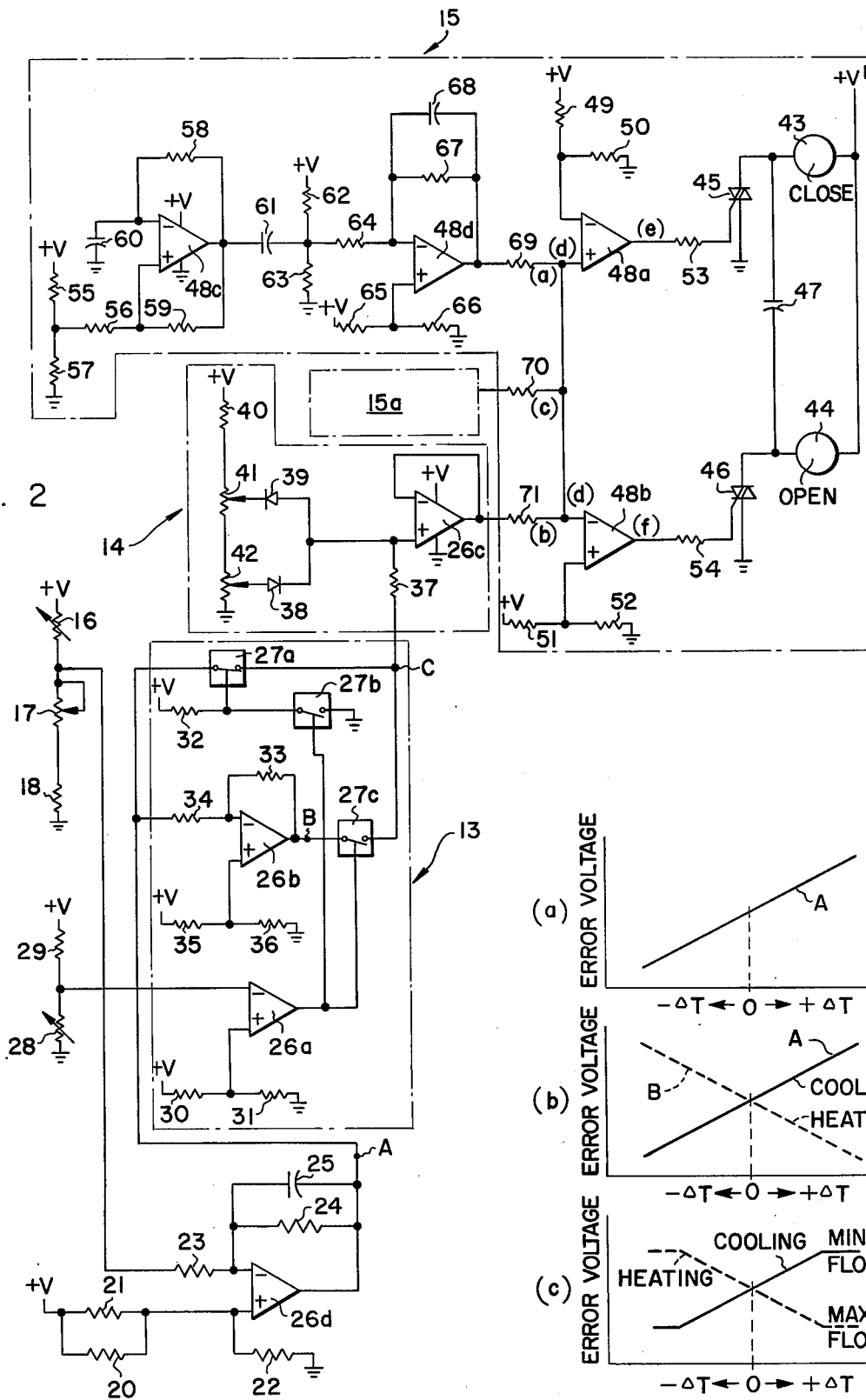
FIG. 2 is an electrical circuit schematic diagram of the temperature control of the present invention.

Turning now to FIG. 2 of the drawings, a preferred embodiment of the temperature control of the present invention will be described.

The electrical circuitry illustrated in FIG. 2 may be broken down for convenience into several functional blocks which include changeover circuit means 13, flow limit circuit means 14, valve motor control circuit means 15, and feedback circuit means 15$_a$. Conventional electrical symbols are used throughout FIG. 2 and the symbol "+V" has been used to designate a suitable source of DC voltage and the symbol "+V'" has been used to represent a source of AC voltage. The conventional symbol of "common" or "ground" has been utilized throughout.

As seen in FIG. 2, the zone thermostat means includes a temperature responsive thermistor 16 whose resistance varies inversely with temperature, which thermistor is included in a voltage divider circuit also including variable resistor 17 and fixed resistor 18. Variable resistor 17 serves as the set-point adjustment of thermostat means 8 such that the voltage appearing between thermistor 16 and variable resistor 17 comprises an error voltage which varies inversely with respect to the difference between the set-point temperature and the zone temperature. This error voltage signal is inverted, amplified, and offset by circuitry comprising operational amplifier 26d, resistors 20–24, and capacitor 25. Thus, at point A of the circuitry illustrated in FIG. 2, an error voltage signal is produced which is directly proportional to the difference between the set-point temperature as determined by variable resistor 17, and the zone temperature as sensed by thermistor 16, which signal has been amplified and offset to a suitable voltage level as described. This relationship is graphically illustrated in FIG. 3(a).

The error voltage signal is transmitted to changeover circuit means 13 which, as shown, includes operational amplifiers 26a, b, and analog switches 27a, b, and c.

Duct temperature sensing means are provided in the form of thermistor 28 which is disposed at a location so as to sense the temperature of conditioned air being supplied to the conditioned zone. Since thermistor 28 is included within a voltage divider network including resistor 29, an electrical voltage signal is produced therebetween which is related to the temperature of said conditioned air. Since thermistor 28 exhibits a negative temperature coefficient, the aforementioned voltage signal will vary inversely with respect to the conditioned air temperature.

This electrical duct temperature signal is input to voltage comparator 26a such that a signal is produced at its output whenever the duct temperature voltage signal is less than a reference voltage signal produced by voltage divider network comprising resistors 30 and 31.

Thus, when relatively warm conditioned air is being supplied to the conditioned zone during heating, or first mode operation, the duct temperature voltage signal will be low, and comparator 26a will produce a high output signal. Conversely, when relatively cool air is being supplied during cooling, or second mode operation; the duct temperature voltage signal will be at a relatively high value, and the output signal from comparator 26a will be low.

As shown, the output signal from comparator 26a is transmitted to analog switches 27b, c, which assume an open, non-conductive condition when said signal is at a relatively low value but which becomes conductive upon the presence of the high signal from comparator 26a. Thus, analog switches 27b, c, are conducting during heating (first mode operation) and non-conducting during cooling (second mode operation). Analog switch 27a receives a relatively high voltage signal via resistor 32 such that it is conducting so long as analog switch 27b is in its non-conducting position. Upon analog switch 27b assuming a conducting position, switch 27a will become non-conducting due to its connection to ground via switch 27b.

Operational amplifier 26b of changeover circuit means 13 receives the aforementioned voltage error signal, inverts, and offsets same such that the voltage at the output of inverter 26b has the inverse slope of its input voltage, while maintaining constant its magnitude at a temperature deviation of zero. This is accomplished through the provision of voltage divider circuitry comprising resistors 35 and 36 to provide the required offset, and by maintaining the ratio the resistance values of resistors 33 and 34 equal to one.

Reference should now be made to FIGS. 3(a) and 3(b) wherein the voltages at points A ad point B of FIG. 2 are plotted versus the deviation in temperature between the set-point and the zone temperature. Note that for a deviation in said temperature of zero degrees, the voltages at points A and B are equal.

Since the error voltage from point A is transmitted to analog switch 27a in addition to inverter 26b, it follows that, depending upon the relative conditions of switches 27a, b, and c, that either the second mode error voltage from point A or the first mode error voltage signal from point B will be transmitted as an output voltage signal of changeover circuit means 13 at point C. Thus, depending upon the temperature of conditioned air being supplied to zone 2, either the voltage signal from point A or that from point B will be transmitted to point C.

Turning now to a description of flow limit circuit means 14, it may be seen that the error voltage signal from point C is transmitted via resistor 37 to the input of an amplifier 26c providing a unity gain and low impedance for its output signal, which is then transmitted to valve motor control circuit means 15, to be described hereinafter. The error voltage input to amplifier 26c is maintained between a first predetermined minimum limit and a second predetermined maximum limit by means of circuitry including resistors 40, 41, and 42; and diodes 38 and 39. To illustrate, should the error voltage signal drop below that established at the wiper of resistance 42, diode 38 will become conductive and prevent the error voltage signal from dropping below the first predetermined magnitude established thereby. Similarly, should the error voltage signal increase to a magnitude greater than that established by the wiper on variable resistance 41, diode 39 will be rendered conductive so as to prevent an increase in the error voltage signal.

These functions are graphically illustrated in FIG. 3(c) wherein the minimum and maximum voltage limits are graphically depicted with respect to the error voltage signal. As will become apparent hereinafter, these voltage limits are related to desired maximum and minimum flow of conditioned air through the air valve means.

Turning now to a description of the valve motor control circuit means 15, it will be seen that the electric motor which operates the air valve means includes a first set of windings 43 which, when energized, serve to close the valve means; and a second set of windings 44 which, upon energization, serve to open the air valve means. Windings 43 and 44 are energized from a suitable source of AC voltage $+V'$ via respective triacs 45 and 46 which are rendered conductive in a manner which will become apparent hereinafter. A capacitor 47 is connected between windings 43 and 44 so as to provide the phase shift necessary for proper bi-directional operation of the motor.

An operational amplifier 48a is provided which acts as a non-inverting comparator, receiving a combined input signal which includes the voltage error signal from the flow limit circuit means 14. This combined input signal is compared with a reference voltage produced by the voltage divider network including resistors 49 and 50. Upon the aforesaid combined input signal increasing above said reference signal, an output signal is produced by comparator 48a and transmitted via resistor 53 to render triac 45 conductive, thereby energizing windings 43 so as to move the valve means in a closing direction, thereby decreasing the flow of conditioned air to conditioned zone 2.

A second operational amplifier 48b is provided which is connected as an inverting comparator which receives the same combined input signal as does comparator 48a, and compares same with a second reference signal produced by the voltage divider network illustrated which includes resistors 51 and 52. Upon the input signal falling below the aforesaid second reference signal, comparator 48b will produce an output signal and transmit same via resistor 54 to render triac 46 conductive and thereby energize windings 44 so as to move the valve means in its opening position, thereby increasing the flow of conditioned air to conditioned zone 2.

Figure 4:
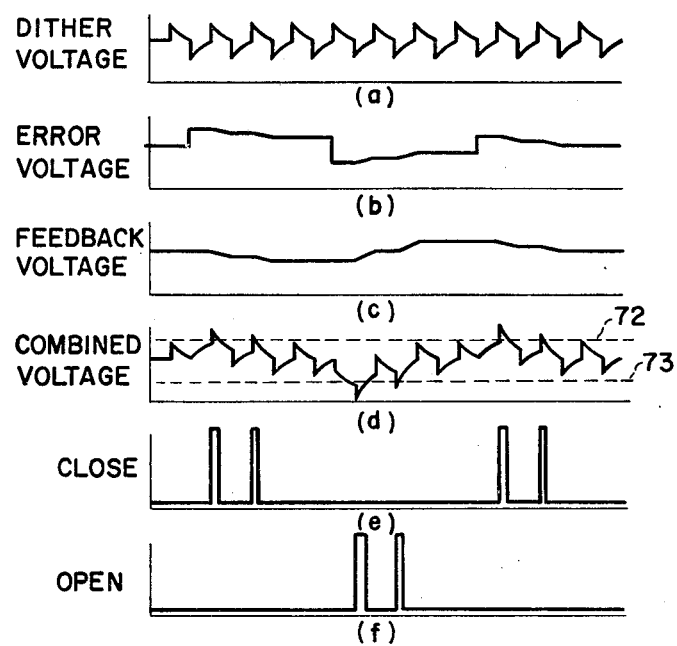
FIG. 4 is a series of graphs depicting certain voltages present within the circuitry of FIG. 2 which serve to illustrate operation of the control circuitry.

Turning now to FIG. 4 of the drawings, graphs (a) through (d) are provided to illustrate the voltage signals present at the corresponding points (a) through (d) appearing in the circuit diagram of FIG. 2.

Initially, it should be noted that a dither voltage is generated, as illustrated in FIG. 4a, by circuitry which includes an oscillator section, a differentiator section, and an integrator section. The oscillator section includes resistors 55 through 59, capacitor 60, and operational amplifier 48c. Since the operation of this circuitry is conventional and known to those skilled in the art, no detailed description of the operation thereof is deemed necessary. Reference may be had to OPERATIONAL AMPLIFIERS DESIGN AND APPLICATIONS by Gene E. Tobey, McGraw-Hill, 1971, page 374 for a description of this type circuit.

The differentiator section of the dither generator includes capacitor 61 and resistors 62 and 63, similar to circuitry illustrated in ELECTRONICS FOR ENGINEERS AND SCIENTISTS by R. Ralph Benedict, Prentiss Hall, Inc., 1967, page 402.

The integrator section of the dither generator comprises resistors 64 through 67, capacitor 68, and operational amplifier 48d. The operation of this circuitry is likewise known to those skilled in the art and produces a final dither voltage as illustrated in FIG. 4a. which voltage is transmitted via resistor 69 to be combined with the error voltage signal as illustrated to form the combined input signal referred to above.

A third voltage signal to be combined with the aforementioned dither voltage signal and the error voltage signal to arrive at the combined input signal is produced by feedback circuit means 15a.

As mentioned above, this feedback voltage may be a voltage signal produced by air flow sensing apparatus 10, 11 (see FIG. 1) associated with the air valve means which is related to the actual flow of conditioned air through the air valve means. Apparatus and circuitry for producing such a voltage signal are fully disclosed in the copending, commonly assigned application referred to at the beginning of this application.

In leiu of flow sensors 10, 11, it should be understood that a simple position feedback scheme could be utilized whereby a variable resistance associated with the air valve means produces a feedback voltage signal representative of the relatively position of the air valve means between its open and closed position. Such a signal would be related to the actual flow of conditioned air through the air valve means but not as accurate as the flow sensor described above. Such feedback schemes are well-known to those skilled in the art and no further description thereof is deemed necessary.

The feedback voltage is transmitted via resistor 70 to be combined with the dither voltage and the error voltage signal which has been transmitted via resistor 71 in order to produce the combined input signal to be input to comparators 48a and 48b.

It should be noted that the feedback voltage signal must be one which varies in the opposite sense as does the error voltage signal. Thus, since the error voltage signal (d) increases in order to close the air valve means, the feed-back signal must decrease in response to closing of the air valve means, as sensed by a decrease in air flow therethrough. In this manner, the valve motor control circuit means respond such that the actual volume of conditioned air flow through the air valve means is related to the magnitude of the error voltage signal, thereby preventing a flow of conditioned air in excess of the maximum and minimum limits set by flow control circuit means 14, as described above. It should further be pointed out that the feedback voltage signal is related to the error voltage signal and reference voltage 72 and 73 such that, for an error voltage signal representing zero temperature deviation, approximately 50% of the air valve means capacity is provided.

Turning now to FIG. 4(d), the combined voltages at point (d) are illustrated graphically with respect to time along with the reference voltages 72 and 73 which are applied to respective comparators 48a and 49b. As is apparent from FIGS. 4(e) and 4(f), upon the combined voltage (d) either exceeding voltage 72 or becoming less than voltage 73, respective closing or opening signals are produced by the comparators in order to render conductive respective triacs 45 and 46, thereby energizing respective windings 43 and 44 so as to effect operation of the air valve means in the appropriate sense. The provision of the feedback voltage signal by feedback circuit means 15a insures stability within the control system in that, as corrective action is taken by the air valve means, it is reflected in the feedback signal, either in the form of increased or decreased air flow or by a change in relative position of the valve member. The function of the dither signal (a) is simply to provide a more gradual control and prevent rapid changes in the valve position.

It should now be apparent that the valve motor control circuit means of FIG. 2 respond to an increase in the error voltage signal (b) to move the air valve means in a closing direction, and, upon a decrease in the error voltage signal, move the air valve means in an opening direction. From a consideration of FIG. 3, it will be clear that an increase in the error voltage signal will be brought about in response to the satisfaction of either a heating or cooling demand, whereas a decrease in the error voltage signal (b) will be brought about in response to a demand for either heating or cooling. Also, from a perusal of FIG. 3(c), it will be apparent that the flow limit circuit means of FIG. 2 are operative to impose minimum and maximum values upon the temperature error signal (b) so as to prevent opening or closing of the air valve means to undesirable positions.

It should be pointed out at this time that, although a thermistor 28 is illustrated in FIG. 2 as the duct temperature sensing means, in the event that the velocity sensing apparatus of the above-referenced copending application were utilized, a common duct temperature sensor (e.g., thermistor 7 from the referenced application) would be used to provide both voltage signals.

Appearing immediately below is a table listing the components and specifications thereof which applicants have found suitable for use in the circuit of FIG. 2. It will be appreciated by those skilled in the art, however, that for any specific application of a temperature control as disclosed, the circuitry would necessarily be tailored so as to provide optimum results therein.

| Reference Numeral | Item | Manufacturer/Description |
|---|---|---|
| 16 | Thermistor | Keystone RL 23B1 |
| 17 | Potentiometer | Bourns 3358, 2.5K |
| 18 | Resistor | Allen-Bradley (A-B) RC07 2.0K, 5% |
| 26a, b, c, d | Quad Op Amp | National LM 324 N |
| 20 | Resistor | A-B RN55D 10.5K, 1% |
| 21 | Resistor | A-B RC07 750K, 5% |
| 22 | Resistor | A-B RN55D 10K, 1% |
| 23 | Resistor | A-B RN55D 46.4K, 1% |
| 24 | Resistor | A-B RN55D 1.0M, 1% |
| 25 | Capacitor | Illinois Cap RCR 0.1 mfd |
| 27a, b, c | Analog Switch | Motorola MC14066 CP |
| 28 | Thermistor | Renwal UUA41J1 |
| 29 | Resistor | A-B RC07 4.3K, 5% |
| 30 | Resistor | A-B RC07 10K, 5% |
| 31 | Resistor | A-B RC07 24K, 5% |
| 32 | Resistor | A-B RC07 270K, 5% |
| 33 | Resistor | A-B RN55D 10K, 1% |
| 34 | Resistor | A-B RN55D 10K, 1% |
| 35 | Resistor | A-B RN55D 23.7K, 1% |
| 36 | Resistor | A-B RN55D 10.2K, 1% |
| 37 | Resistor | A-B RC07 300K, 5% |
| 38, 39 | Diode | Motorola 1N914 |
| 40 | Resistor | A-B RN55D 13.3K. 1% |
| 41, 42 | Potentiometer | A-B D2A103 10K |
| 43, 44 | Motor | Molon LM03000 |
| 45, 46 | Triac | Motorola 2N6070A |
| 47 | Capacitor | Illinois Cap BPR 22 mfd |
| 48a, b, c, d | Quad Op Amp | National LM 324N |
| 49 | Resistor | A-B RN55D 10.2K, 1% |
| 50 | Resistor | A-B RN55D 10K, 1% |
| 51 | Resistor | A-B RN55D 18.7K, 1% |
| 52 | Resistor | A-B RN55D 10.2K, 1% |
| 53, 54 | Resistor | A-B RC20 .820K, 5% |
| 55, 57 | Resistor | A-B RC07 4.7K, 5% |
| 56 | Resistor | A-B RC07 56K, 5% |
| 58 | Resistor | A-B RC07 2.7M, 5% |

| Reference Numeral | Item | Manufacturer/Description |
|---|---|---|
| 59 | Resistor | A-B RC07 10K, 5% |
| 60, 61 | Capacitor | Illinois Cap MSR 0.47 mfd |
| 62, 63 | Resistor | A-B RN55D 100K, 1% |
| 64 | Resistor | A-B RN55D 402K, 1% |
| 65, 66 | Resistor | A-B RN55D 10K, 1% |
| 67 | Resistor | A-B RN55D 2M, 1% |
| 68 | Capacitor | Illinois Cap MSR 0.22 mfd |
| 69 | Resistor | A-B RC07 10K, 5% |
| 70 | Resistor | A-B RC07 30K, 5% |
| 71 | Resistor | A-B RC07 10K, 5% |
| +V | Voltage Source | 12 V D.C. |
| +V' | Voltage Source | 21-28 V A.C. |

It should further be recognized that, although the present invention is disclosed for use with air valve means of the type disclosed in U.S. Pat. No. 4,082,114, that it would also have application with air valves of more conventional design and construction.

While the invention has been described with respect to a preferred embodiment, it is to be understood that modifications thereto will be apparent to those skilled in the art within the scope of the invention, as defined in the claims which follow.

We claim:

1. A temperature control for a variable volume air conditioning system wherein electric motor-operated air valve means are provided for varying the volume of relatively warm or relatively cool conditioned air supplied to a conditioned zone, said temperature control comprising
    a. zone thermostat means for sensing the temperature within a conditioned zone, determining the deviation between a set-point temperature and said zone temperature, and for producing an electrical error signal comprising a voltage having a magnitude which varies in a predetermined relationship with respect to said deviation in temperature;
    b. duct temperature sensing means for sensing the temperature of conditioned air being supplied to said conditioned zone and for producing an electrical duct temperature signal related thereto;
    c. changeover circuit means for receiving said error and duct temperature signals and comprising
        i. an inverter for receiving said error signal and operative to vary said predetermined relationship between the magnitude of said error signal and said deviation in temperature, thereby producing a first mode error signal comprising a voltage signal having a magnitude inversely related to that of said error voltage signal; and
        ii. switch means responsive to said electrical duct temperature signal for transmitting said first mode error signal as an output error signal in response to a temperature of said conditioned air indicative of one of relatively warm or relatively cool conditioned air being supplied to said conditioned zone, and for transmitting a second mode error signal as an output error signal in response to a temperature of said conditioned air indicative of the other of said relatively warm or relatively cool conditioned air being supplied to said conditioned zone, said predetermined relationship between the magnitude of said error signal and said deviation in temperature being maintained in said second mode error signal; and
    d. valve motor control circuit means for receiving said output error signal and for energizing electric motor-operated air valve means in response thereto so as to vary the volume of conditioned air being supplied to said conditioned zone in a sense to restore the zone temperature to the set-point temperature.

2. The temperature control of claim 1 wherein said deviation in temperature varies over a range which includes negative values wherein the set-point temperature is less than the zone temperature, a zero value wherein the set-point temperature equals the zone temperature, and positive values wherein the set-point temperature is greater than the zone temperature; and wherein said predetermined relationship comprises the magnitude of said electrical error signal exhibiting one of continuous increases or decreases over said range.

3. The temperature control of claim 2 wherein said changeover circuit means is operative to vary said predetermined relationship to the other of said continuous increases or decreases over said range in response to a temperature of said conditioned air indicative of said one of relatively warm or relatively cool conditioned air being supplied to said conditioned zone.

4. The temperature control of claim 3 wherein the magnitudes of said first and second mode error signals vary in a substantially linear fashion over said range.

5. The temperature control of claim 3 or 4 wherein said changeover circuit means are further operative to maintain constant the value of said electrical error signal when said deviation in temperature is at said zero value while varying said predetermined relationship.

6. A temperature control for a variable volume air conditioning system wherein electric motor-operated air valve means are provided for varying the volume of relatively warm or relatively cool conditioned air supplied to a conditioned zone, said temperature control comprising
    a. zone thermostat means for sensing the temperature within a conditioned zone, determining the deviation between a set-point temperature and said zone temperature, and for producing an electrical error signal having a magnitude which varies in a predetermined relationship with respect to said deviation in temperature;
    b. duct temperature sensing means for sensing the temperature of conditioned air being supplied to said conditioned zone and for producing an electrical duct temperature signal related thereto;
    c. changeover circuit means for receiving said error and duct temperature signals and operative to
        i. vary said predetermined relationship between the magnitude of said error signal and said deviation in temperature, thereby producing a first mode error signal, and transmit said first mode error signal as an output error signal in response to a temperature of said conditioned air indicative of one of relatively warm or relatively cool conditioned air being supplied to said conditioned zone; or
        ii. maintain said predetermined relationship between the magnitude of said error signal and said deviation in temperature, thereby producing a second mode error signal, and transmit said second mode error signal as an output error signal in response to a temperature of said conditioned air indicative of the other of said relatively warm or relatively cool conditioned air being supplied to said conditioned zone;

d. valve motor control circuit means for receiving said output error signal and for energizing electric motor-operated air valve means in response thereto so as to vary the volume of conditioned air being supplied to said conditioned zone in a sense to restore the zone temperature to the set-point temperature;

e. flow limit circuit means for receiving said output error signal and responsive to the magnitude thereof to impose thereon at least a first limit beyond which its magnitude cannot vary, said first limit being related to one of the maximum or minimum desired flow of air through said air valve means; and f. feedback circuit means for producing an electrical feedback signal related to the actual volume of conditioned air flow through said air valve means, said valve motor control circuit means receiving said electrical error signal and said electrical feedback signal and responsive thereto such that the actual volume of conditioned air flow through said air valve means is related to the magnitude of said electrical error signal, thereby preventing a flow of conditioned air beyond said one of the maximum or minimum desired flow of conditioned air.

7. The temperature control of claim 6 wherein said flow limit circuit means are further responsive to the magnitude of said electrical error signal to impose thereon a second limit beyond which its magnitude cannot vary, said second limit being related to the other of said maximum or minimum desired flow of conditioned air through said air valve means, whereby said valve motor control circuit means are further operative to prevent a flow of conditioned air beyond the other of said maximum or minimum desired flow.

8. The temperature control of claim 7 wherein said first and second limits comprise maximum and minimum magnitudes beyond which the magnitude of said electrical error signal cannot vary.

9. The temperature control of claim 8 wherein said electrical error signal comprises a voltage.

10. The temperature control of claim 7 wherein said flow limit circuit means includes means for adjusting said first and second limits.

* * * * *